March 8, 1927.

D. BAKER

INTERLINER

Filed Dec. 10, 1924

WITNESS
Robt. S. Woolsey

INVENTOR
DAVID BAKER

Patented Mar. 8, 1927.

1,620,054

UNITED STATES PATENT OFFICE.

DAVID BAKER, OF LOS ANGELES, CALIFORNIA.

INTERLINER.

Application filed December 10, 1924. Serial No. 754,993.

An object of this invention is to provide an interliner for the inner tube of a pneumatic tire that is effective in protecting the tube from injury. To that end, I provide an interliner in the form of an annular covering that completely encloses the inner tube; and the covering is provided with a resilient tread armor that is adapted to protect the outer periphery of the tube from a radial puncture.

An object of this invention is to provide an interliner for an inner tube with means connected therewith that is adapted to hold the inner tube from creeping relative to a pneumatic tire. To that end, I provide a cover having oppositely arranged annular flanges that are adapted to be secured between the inner periphery of a pneumatic tire and a tire rim so that when the annular flanges are secured in place and the tube inflated the cover will be held in a fixed position relative to the tire and rim.

An object of the invention is to provide an interliner for an inner tube that is simple to construct, neat in appearance, easy to install and durable in use.

Features of the invention are shown in the construction, combination and arrangement of the parts whereby an appliance is provided that is adapted to protect a tube from a puncture and that also forms a reinforcement to the entire exterior surface of a pneumatic tube.

Other objects, advantages and features of invention may appear from the accompanying drawings, the subjoined detailed description and the appended claim.

The accompanying drawing illustrates the invention.

Fig. 1 is an enlarged cross section, showing a detailed construction of the interliner detached from an inner tube.

Fig. 2 is an enlarged cross section, showing the interliner in use enclosing and guarding an inner tube.

The interliner or cover guard 1 is formed of fibrous material preferably heavy canvas; and it is constructed and arranged so as to completely enclose an inner tube 2.

The interliner 1 is formed with an outer annular canvas casing 3 that at its inner periphery terminates in annular flanges 4, 5 that extend outward in opposite directions to one another; and when in use these flanges are fitted in between the rim 6 of a vehicle wheel 7 and the inner periphery of a tire 8; so that when the inner tube is inflated with air the pressure will securely hold the interliner 1 from creeping in the tire.

Another annular canvas casing is secured inside of the casing 3 and it comprises a looped or folded portion 9 that is secured to the casing 3 by annular stitchings at 10 and 11; and a flap portion 12 that is secured to the casing 3 by an annular stitching at 13.

The looped or folded portion 9 is constructed and arranged to form an annular pocket that is adapted to enclose a resilient tread guard 14 and hold it in a position to protect the outer periphery and side portions of the inner tube 2 from punctures.

The guard 14 is preferably formed of resilient metal segments that are constructed and arranged with telescoping ends, so that the armor 14 can expand and contract to compensate for a greater or less inflation of the inner tube; and also so that the armor can readily yield to compensate for an impact on the tire 8.

In use the interliner 1 is fitted securely around the tube 2 to entirely enclose it as shown in the drawing; and then the covered tube is inserted into the tire 8 so that the outer surface of the casing 3 is fitted snugly to the inner surface of the tire; and the parts are arranged so that the annular flanges 4, 5 extend over the inner periphery of the tire to be secured as previously described; it being understood of course that a suitable opening is provided in the interliner 1 through which a valve stem not illustrated is adapted to extend.

The appliance thus provided and arranged is adapted to reinforce the entire outer covering of the inner tube in addition to protecting its outer periphery and side portions with a resilient armor adapted to protect the tube against any ordinary puncture.

I claim:

A guard for inner tubes of pneumatic tires, comprising an outer annular tube enveloping casing; annular flanges formed on said casing and adapted to be secured between the tire and a rim; an annular canvas inner casing secured to the inner wall of said outer casing, said inner casing having a folded annular portion forming a pocket adapted to lie between the inner tube and tire adjacent the tread portion thereof; a loose annular flap formed integral with said inner casing and adapted to be fitted over the inner periphery of the said inner tube; and the said pocket being adapted for the reception of a resilient armor.

In testimony whereof, I have hereunto set my hand at Los Angeles, California, this 4th day of December, 1924.

DAVID BAKER.